Nov. 2, 1965    L. H. J. TOLLET    3,215,302
NUCLEAR REACTOR CLOSURE
Filed Feb. 21, 1962

United States Patent Office 3,215,302
Patented Nov. 2, 1965

3,215,302
NUCLEAR REACTOR CLOSURE
Louis Henri Joseph Tollet, Brussels, Belgium, assignor, by mesne assignments, to Société anglo-belge Vulcain, société anonyme, Brussels, Belgium
Filed Feb. 21, 1962, Ser. No. 174,798
Claims priority, application Belgium, Mar. 9, 1961, 601,108
2 Claims. (Cl. 220—24)

This invention relates to nuclear reactors, and more particularly to the covers of the reactor vessels.

The covers of reactor vessels under pressure are necessarily large, heavy and expensive parts.

The invention has for its object to provide simple and non expensive means for increasing the resistance to pressure of the cover.

The invention consists in utilizing internal parts of the reactor vessel which serve to other purposes than resistance, for increasing the mechanical resistance to pressure of the cover.

According to another characteristic feature of the invention, reinforcements of material are provided so that they shall fill as much as possible empty spaces which it is otherwise economical to reduce, for instance spaces holding heavy water, which is a very costly product. This may be effected by replacing heavy water by metallic masses inside the reactor whilst simultaneously increasing, thanks to the said metallic masses, the mechanical resistance of the cover.

In the accompanying drawings.

Figure 1:
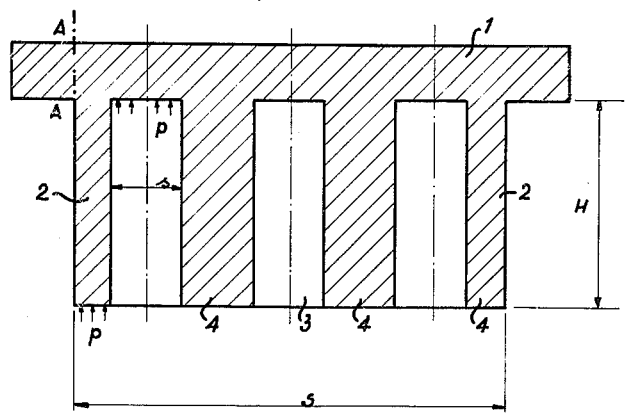
FIGURE 1 is a section made along the line X—X of FIGURE 2.

Referring to the drawings, a plate 1 ensures a tight joint fit and also helps partly to increase the mechanical resistance of the cover.

It is provided with the material required for providing supporting faces for sealing parts (joints) and with a housing for attachment elements (bolts).

A nest 2 consists of a thick metal cake, integral with the plate 1, in which hollow spaces 3 are provided; in the said hollow spaces 3 all the inner elements of the reactor vessel may be lodged such as: centering members for fuel assemblies, a housing for lodging ends of fuel assemblies, an enclosure for a shutoff rod mechanism, means for the distribution or collection of various fluids to be used in the reactor, pipings, etc.

Figure 2:
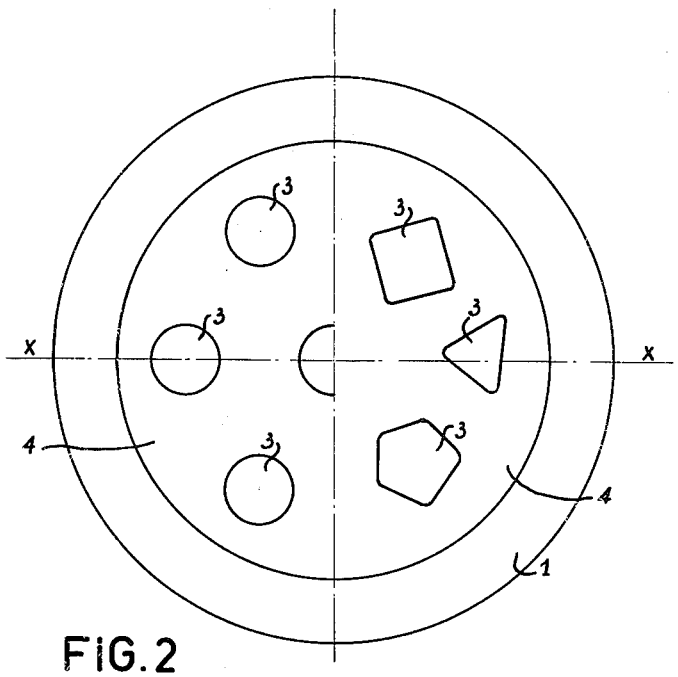
FIGURE 2 shows one mode of carrying a cover into effect, having an outer horizontal flat surface. It is however possible to employ a convex, hollow, a multistage cover, or cover which is ribbed on its outside surface.

As shown by FIGURE 2, which is a plan view corresponding to FIGURE 1, the hollow spaces 3 may have various shapes. The variety of shapes may affect the section and also the profile.

The solid parts 4 may usefully form a filling mass which saves the use of some of the heavy water.

The thrust exerted upon the cover by the inner pressure is equal to $P=P \times S$.

If such thrust is replaced by a fixed charge (non fluid) distributed along an equal section, then giving a sufficient height H to the ribbed surface, the latter may be able to support alone the thrust P if bearing against a circle located at A. The solid portion 1 should in this case, ensure a tight joint fit only; it should resist shearing in a cylindrical section A—A and ensure the resistance to pressure, but for a section $s$ which is smaller than the entire section of the circle.

The combination of the two elements 1 and 2 may lead to the formation of a lid in which the solid part 1 has a reduced volume, the total weight of the lid being itself reduced.

What I claim is:

1. In a cover for a nuclear reactor vessel having a cylindrical cavity therein, a plurality of vertically-disposed elements protruding upwardly into such cavity and wherein the space between such vertical elements is normally filled with a fluid, the improvement comprising:
    (a) a flat circular metal cap larger in diameter than said cavity and thereby having a flange extending about the entire periphery of said cavity and abutting against the walls of the vessel forming said cavity, and
    (b) a cylindrical metal plug formed as an integral part of said cap, said plug being centrally located on said cap, having a diameter substantially equal to the diameter of said cavity, extending into said cavity to a point beyond the ends of said vertical elements in said cavity, and having a plurality of vertical bores formed therein of a size and shape to receive the ends of said vertical elements, whereby at least a portion of the space between said vertical elements is filled by said plug and the volume of fluid necessary to fill said space is reduced.

2. In a cover for a nuclear reactor vessel having a cavity therein, a plurality of vertically-disposed elements protruding upwardly into said cavity and wherein the space between said vertical elements is normally filled with fluid, the improvement comprising:
    (a) a flat metallic cap larger than said cavity and thereby having a flange extending about the entire periphery of said cavity and abutting against the walls of the vessel forming said cavity, and
    (b) a metallic plug forming an integral part of said cap, said plug completely filling the lateral dimensions of said cavity, being of a length sufficient to extend a substantial distance into said cavity, and having formed therein a plurality of vertical bores of a shape and size to receive said vertically-protruding elements.

References Cited by the Examiner
UNITED STATES PATENTS

| | | | |
|---|---|---|---|
| 2,097,173 | 10/37 | Bazeley | 220—24 |
| 2,708,656 | 5/55 | Fermi et al. | 204—193.2 |
| 2,767,864 | 10/56 | Van Litsenburg | 215—37 |
| 2,946,732 | 7/60 | Wootton | 204—193.2 |

THERON E. CONDON, *Primary Examiner.*

REUBEN EPSTEIN, *Examiner.*